US009357394B1

(12) United States Patent
Filatov et al.

(10) Patent No.: US 9,357,394 B1
(45) Date of Patent: May 31, 2016

(54) SYSTEM AND METHOD FOR SELECTING MEANS FOR INTERCEPTING NETWORK TRANSMISSIONS

(71) Applicant: Kaspersky Lab ZAO, Moscow (RU)

(72) Inventors: Konstantin M. Filatov, Moscow (RU); Evgeny Y. Eliseev, Nizhny Novgorod (RU); Victor V. Yablokov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/674,594

(22) Filed: Mar. 31, 2015

(30) Foreign Application Priority Data

Dec. 19, 2014 (RU) ................................. 2014151465

(51) Int. Cl.
*H04L 29/06* (2006.01)
*H04W 12/08* (2009.01)
*H04W 12/02* (2009.01)

(52) U.S. Cl.
CPC .............. *H04W 12/08* (2013.01); *H04W 12/02* (2013.01)

(58) Field of Classification Search
CPC ...... H04W 12/08; H04W 12/02; H04L 9/088; H04L 63/105
USPC .................................... 726/12, 22, 23, 24, 25
See application file for complete search history.

(56) References Cited

U.S. PATENT DOCUMENTS

| | | | | | |
|---|---|---|---|---|---|
| 5,935,248 | A | * | 8/1999 | Kuroda | H04L 29/06 726/1 |
| 6,351,817 | B1 | * | 2/2002 | Flyntz | G06F 21/32 380/202 |
| 6,389,542 | B1 | * | 5/2002 | Flyntz | G06F 21/34 380/202 |
| 7,843,912 | B2 | | 11/2010 | Harris et al. | |
| 8,479,260 | B2 | * | 7/2013 | Price | G06F 21/30 726/3 |
| 8,925,065 | B2 | | 12/2014 | Krywaniuk | |
| 2001/0036273 | A1 | * | 11/2001 | Yoshizawa | H04W 12/06 380/247 |
| 2002/0172365 | A1 | * | 11/2002 | Nakagomi | H04W 12/08 380/270 |
| 2003/0108205 | A1 | * | 6/2003 | Joyner | H04L 9/0618 380/277 |
| 2003/0119484 | A1 | * | 6/2003 | Adachi | H04L 63/04 455/411 |
| 2004/0107345 | A1 | * | 6/2004 | Brandt | G05B 15/02 713/171 |
| 2007/0094400 | A1 | | 4/2007 | Childress et al. | |
| 2008/0010377 | A1 | * | 1/2008 | Nissennboim | H04L 63/20 709/226 |
| 2008/0247545 | A1 | * | 10/2008 | Teruyama | H04L 9/0841 380/255 |
| 2009/0007226 | A1 | * | 1/2009 | Fujii | H04L 63/105 726/1 |

(Continued)

*Primary Examiner* — David Garcia Cervetti
(74) *Attorney, Agent, or Firm* — Arent Fox LLP; Michael Fainberg

(57) ABSTRACT

Disclosed are systems and methods for selecting means for intercepting network transmissions. An example system includes a data collection module configured to determine one or more parameters of a network transmission and one or more parameters of a user device that receives the transmission; a data analysis module configured to determine characteristics of a plurality of network transmission intercepting means that provide different levels of security to intercepted network transmissions based on the determined transmission and user device parameters; a selection module configured to select out of the plurality of network transmission interception means one whose characteristics match to the parameters of the network transmission, parameters of the user device, and a required security level for the network transmission; and an installation module configured to install on the user device the selected network transmission interception means.

18 Claims, 3 Drawing Sheets

(56) References Cited

U.S. PATENT DOCUMENTS

| | | | | |
|---|---|---|---|---|
| 2009/0007246 A1* | 1/2009 | Gutowski | ............. | H04L 63/105 726/6 |
| 2010/0005179 A1* | 1/2010 | Dickson | ................. | H04L 63/30 709/228 |
| 2010/0027414 A1* | 2/2010 | Hamachi | ............... | H04W 48/16 370/216 |
| 2010/0279653 A1* | 11/2010 | Poltorak | .............. | H04M 15/00 455/410 |
| 2011/0154135 A1 | 6/2011 | Tyhurst et al. | | |
| 2013/0019092 A1* | 1/2013 | Levow | ................. | G06F 21/606 713/155 |
| 2014/0112193 A1* | 4/2014 | Lee | ....................... | H04W 48/18 370/254 |
| 2014/0328184 A1* | 11/2014 | Aminaka | ............. | H04L 5/0032 370/237 |
| 2014/0334417 A1* | 11/2014 | Aminaka | ............. | H04W 72/12 370/329 |
| 2015/0040244 A1* | 2/2015 | DeBenedictis | ....... | H04L 63/166 726/27 |
| 2015/0046553 A1* | 2/2015 | DeBenedictis | ......... | H04L 51/04 709/206 |
| 2015/0128204 A1* | 5/2015 | Lietz | ...................... | H04L 63/10 726/1 |

* cited by examiner

SYSTEM AND METHOD FOR SELECTING MEANS FOR INTERCEPTING NETWORK TRANSMISSIONS

CROSS-REFERENCE TO RELATED APPLICATIONS

This application claims benefit of priority under 35 U.S.C. 119(a)-(d) to a Russian Application No. 2014151465 filed on Dec. 19, 2014, which is incorporated by reference herein.

FIELD OF TECHNOLOGY

The disclosure relates generally to the field of network security and, more specifically, to systems and methods for selecting means for intercepting network data transmissions.

BACKGROUND

In recent years, mobile devices such as telephones, smartphones and personal digital assistants (PDAs) have become extremely popular (e.g., at the start of 2014 the number of mobile devices connected to a network exceeded the population of the Earth). Accordingly, several urgent problems have arisen: ensuring the security of personal user data being kept on a mobile device, that is, protecting this data against theft or damage carried out with the aid of malicious software; and preventing user access to undesirable information, such as advertising, sites containing pornographic multimedia data, such as photographs or video clips (e.g., if the mobile device is in the possession of a child), or to undesirable links to external servers (e.g., to the smartphone software update server when the smartphone is in roaming mode).

The principal ways of solving these problems are the intercepting of both downlink and uplink network transmissions and the monitoring of the transmitted data. In this case, the software controlling the network traffic decides which data should be transmitted or received, which data should be blocked, and which data should be set aside for a decision by the user.

Various means can be used to intercept data being transmitted in a network, such as a proxy server, a VPN client, or a firewall. Each of the aforementioned means has its advantages and disadvantages. For example, a proxy server is generally best suited to intercepting http traffic, it is easier to set up, and it can be installed in an operating system not having administrator rights; the VPN client, on the other hand, is able to work with any given types of data being transmitted in the network, but is more complicated to control and requires administrator rights to work in an operating system. The firewall has certain advantages of both a proxy server and a VPN client, but is more demanding on the resources of the mobile device. Accordingly, the installed interception means often do not work optimally.

Thus, the main problem in the use of intercept means comes down to selecting an intercept means which is best suited to the current task of intercepting data being transmitted on a network, and then implementing the selected means on the user's device.

SUMMARY

Disclosed are systems and methods for selecting means of intercepting data being transmitted in a network for subsequent installation in an operating system of a user device. Some technical results are to improve security for the network data transmissions and optimization in the utilization of the resources of the operating system and the user device.

In one example aspect, a method for selecting means for intercepting network transmissions comprising: determining, by a hardware processor, one or more parameters of a network transmission and one or more parameters of a user device that receives the transmission; determining characteristics of a plurality of network transmission intercepting means that provide different levels of security to intercepted network transmissions based on the determined transmission parameters and user device parameters; selecting out of the plurality of network transmission interception means one means whose characteristics match the parameters of the network transmission, parameters of the user device, and a required security level for the network transmission; and installing on the user device the selected network transmission interception means that provide the required security level for the transmission received by the user device.

In another example aspect, one or more parameters of a network transmission include: the type of data transmission network; the type of transmitted data; and the type of data transmission protocol.

In another example aspect, one or more parameters of the user device include: one or more parameters of an operating system of the user device; and the name of the software application to which the data transmission is directed.

In another example aspect, parameters of the operating system include: access rights to the resources of the operating system; and the presence of resources of the operating system on the user device.

In another example aspect, the characteristics of the network transmission interception means include: the ability to process certain types of data; the ability to identify data transmission means; the ability to identify data reception means; and the ability to work with various resources of the operating system.

In another example aspect, the level of security may indicate at least one of: how the intercepted data may be manipulated and under what conditions said manipulations are permitted.

In another aspect, an example system for selecting means for intercepting network transmissions comprising: a data collection module configured to determine one or more parameters of a network transmission and one or more parameters of a user device that receives the transmission; a data analysis module configured to determine characteristics of a plurality of network transmission intercepting means that provide different levels of security to intercepted network transmissions based on the determined transmission parameters and user device parameters; a selection module configured to select out of the plurality of network transmission interception means one means whose characteristics match the parameters of the network transmission, parameters of the user device, and a required security level for the network transmission; and an installation module configured to install on the user device the selected network transmission interception means that provide the required security level for the network transmission received by the user device.

In another aspect, an example non-transitory computer readable medium storing computer executable instructions for selecting means for intercepting network transmissions, including instructions for: determining one or more parameters of a network transmission and one or more parameters of a user device that receives the transmission; determining characteristics of a plurality of network transmission intercepting means that provide different levels of security to intercepted network transmissions based on the determined transmission parameters and user device parameters; selecting out of the plurality of network transmission interception means one means whose characteristics match the parameters of the network transmission, parameters of the user device, and a required security level for the network transmission; and installing on the user device the selected network transmission interception means that provide the required security level for the transmission received by the user device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product selection of means of intercepting data being transmitted on a network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
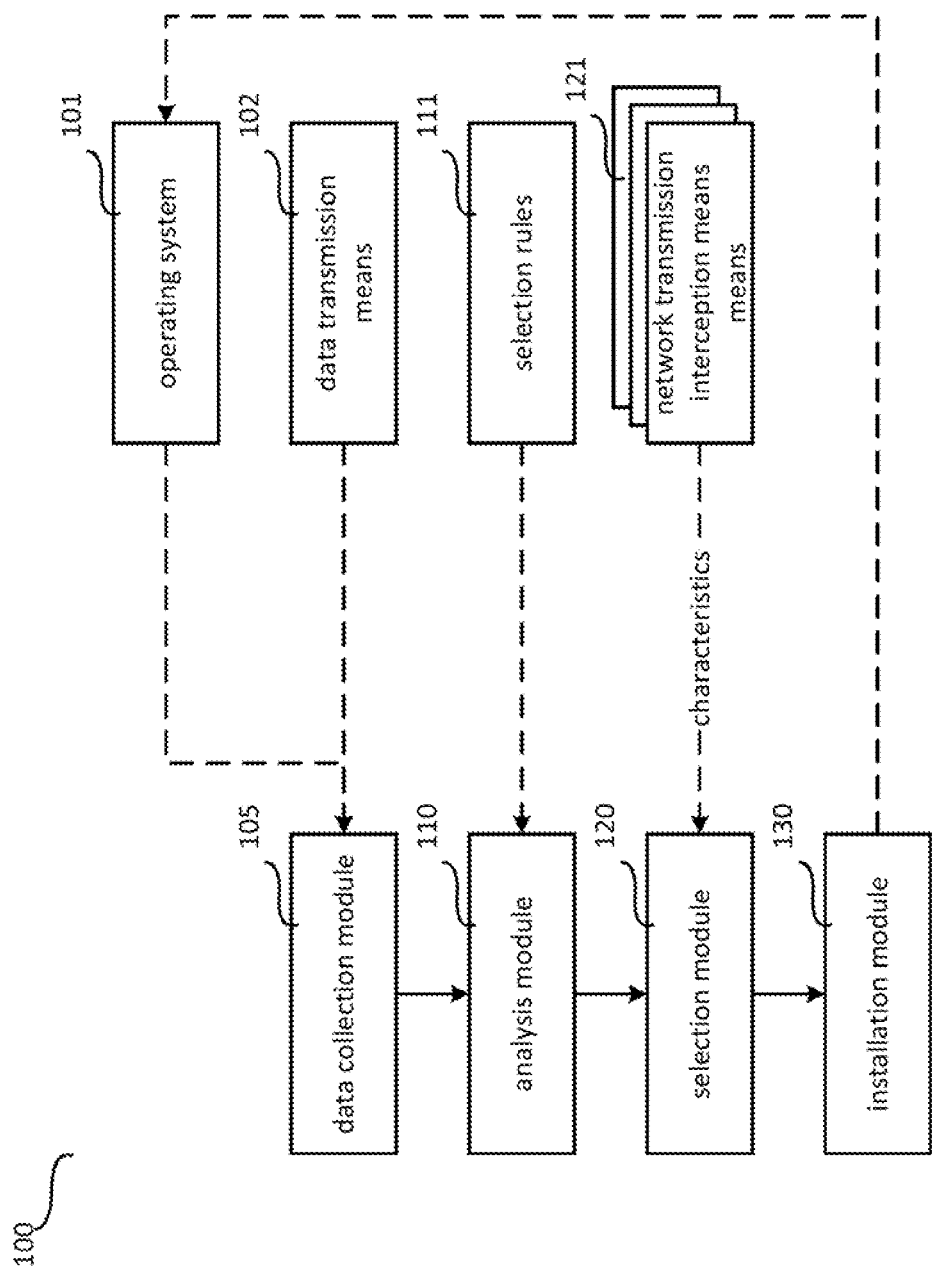
FIG. 1 illustrates a block diagram of an example system for selecting means for intercepting network data transmissions according to one aspect of the invention.

FIG. 1 illustrates a block diagram of an example system 100 of selection of means of intercepting data transmissions in a network. The system 100 may be implemented on network server or personal computer connected to a computer network. The system 100 may include a data collection module 105, an operating system 101, data transmission means 102, an analysis module 110, selection rules 111, a selection module 120, a set of network transmission interception means 121 and an installation module 130.

The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 below). Accordingly, each module can be realized in a variety of suitable configurations, and should not be limited to any particular implementation exemplified herein.

In one example aspect, the data collection module 105 is configured to determine and collect information network transmission and device parameters, including, but not limited to:

the type of data transmission in the network;
the parameters of the data transmissions;
the parameters of communication devices performing transmission of data, such as network servers, routers, firewalls, and other network devices.
the parameters of the operating system 101 of the device whose transmissions are being intercepted (e.g., a smartphone, a personal computer, a network server, etc.).

The data collection module 105 also configured to send this data to the analysis module 110.

The type of data transmission may include, but not limited to:

a wireline network transmission, such as Ethernet transmission;
a wireless network transmission, such as Wi-Fi or Bluetooth transmission; and
a cellular network transmission, such as 4G LTE transmission.

The data transmission parameters may include, but not limited to:

the type of data being transmitted (e.g., images or executable files);
the type of data transmission protocol (e.g., http protocol);
parameters of the data transmission means 102; and
parameters of the data reception means (not shown).

The data transmission means 102 may include a computer from with the data transmission originates, such as personal computer, a smartphone, a network server (e.g. e-commerce website), a streaming media service, etc. The parameters of the data transmission means 102 may include, but not limited to the domain name and IP address of the data transmission means 102 from which the data transmission originates.

The parameters of the data reception means (not shown), may include the name of the software application to which the data transmission is directed.

The parameters of the operating system may include, but not limited to:

access rights to the resources of the operating system; and
the presence of resources of the operating system.

In an example aspect, the access rights may include, but not limited to, rights to read, write, and/or execute, computer resources, such as files, drivers, OS registry, etc. For example, the access rights may consist in the right to modify (i.e., read and write) a file, such as the "c:\windows\system32\drivers\etc\hosts" file containing correspondences between IP numbers and domain names. Another example of access rights is the right to write a file onto a hard drive (for example, the "C:" drive) or to write data or a file into computer memory. Yet another example of access rights is to read or modify OS registry keys and device drivers.

In an example aspect, the resources of the operating system may include the computer resources, such as input devices, output devices, hard drives, external storage devices, RAM, etc., processor availability, network connections etc. The resources of the operating system may also include kernel resources, such as operating system processes and threads. The resources of the operating system may also include recourses of programs running under the operating system, such as setting files. In an example aspect, the parameters of the resources include presence flags (indicating whether the resource is present or absent in the system), access rights (such as read, write, and/or execution for system users), resource properties (such as capacity for input and output devices, size and location for files, names for accounts, etc.)

The characteristics of the network transmission interception means 121 may include, but not limited to:
- the ability to process data of a given type being transmitted in the network;
- the ability to identify the data transmission means 102;
- the ability to identify the data reception means; and
- the ability to work with given resources of the operating system.

In one example aspect, the analysis module 110 is configured to determine the characteristics of the data transmission means 121 that ensures a specified level of security of the transmitted data using of the parameters determined by the data collection module 105, and to send these characteristics to the selection module 120.

In one example aspect, the selection module 120 is configured to select the network transmission interception means 121, which match the characteristics obtained from the analysis module 110 and to transmit the identifier of the selected means to the installation modules 130.

In one example aspect, the set of network transmission interception means 121 include data interception devices (either hardware and/or software based) operable to intercept data transmitted on the network in order to ensure different levels of security of the data. These means may include, but not limited to: a proxy server, a VPN client, a firewall and other types of network traffic processing devices. For example, a firewall may be used for simple restrictions of network activity for selected applications or network connections when it is necessary to permit or prevent connection and/or data exchange between a client (such as a PC user) and a server (such as a web site, etc.). A firewall is a good tool for this purpose with modest requirements to PC capabilities. A proxy server is software implementing a network service allowing client computers to send indirect queries to other network services. Compared with a firewall, it generally requires more operating system resources and may be slower. However, it has a wider range of capabilities. Besides blocking network connections, a proxy server can intercept, process, and modify data transmitted over a network. A VPN client is an application using technologies for establishing one or several network connections (a logical network) on top of another network. Such approach to data interception has broad capabilities (which may be even excessive), but often requires great amount of operating system resources (such as the memory size) and is generally slower. However, this is a very flexible approach, which may be used when security policies do not permit using a proxy server.

In one example aspect, the installation module 130 is configured to gain access to the parameters of the operating system 101 and modify them with the use of the received identifier of the network transmission interception means 121.

In one example aspect, the system for selecting means of intercepting data transmitted in a network may be used to ensure the security of the transmission of data from an e-commerce site (e.g., amazon.com) to a browser (e.g., Google Chrome) running on a user's smartphone (e.g., under the control of the Google Android OS). To that end, network transmission interception means 121, such as proxy server, may be selected and installed on the user's smartphone, to receive data from the e-commerce site, process it, and transmit the processed data to the browser.

In an example aspect, the web site access is handled as follows. Instead of browser processing data received over a network (for example, by displaying on the screen and executing received scripts), the data are intercepted and checked for maliciousness. The portion of data determined to be benign is sent (to the extent to which it is possible) to the browser for further processing. The portion of data determined to be malicious, if any, is deleted and replaced, if necessary, with new data; for example, a spam image is replaced with an image warning that the site is distributing spam.

The process, in an example aspect, starts with the data collection module 105 determining a number of parameters that will be needed to select transmission interception means 121. These parameters may include, but not limited to the type of data transmission, the parameters of the data transmission means 102, and the parameters of the operating system 101 in which the network transmission interception means 121 will be installed. For example, the data collection module 105 has determined that the data transmission is occurring in a Wi-Fi network, the data is html code being transmitted by the http protocol, the data transmission means 102 include the server amazon.com, the data reception means is the Google Chrome application, the operating system has more than 1 GB working memory available, and there is access to modification of the nonpublic fields of the class android.net.wifi.WifiConfiguration. The collected data is sent to the analysis module 110.

The data analysis module 110 based on the parameters received from the data collection module 105 determines the characteristics of the available network transmission interception means 121 using selection rules 111. An example rule 111 may dictate that the security level of the data being transmitted in the network provided by the network transmission interception means 121 should not be less than a specified threshold. The security levels for data access may be specified using two criteria: how the data may be manipulated (reading, writing, execution, etc.) and under what conditions the manipulations are permitted. In one aspect, an example rule may specify that the data transmitted over a network may be only stored on a device for further use (when writing is permitted); or may be used to modify data present on a PC (when reading and writing is permitted); or may be executed, as in the case of html scripts (when execution is permitted). The data manipulations may be possible only when some other data is present. An example of the application of such a rule may be when an image is transmitted together with a script for the image (e.g., using JavaScript), if the script is not allowed to execute, the image is not allowed to be stored either (even if the image received alone could be stored on the user PC).

In another aspect, for a web site to browser connection, for example, the selection rules 111 may specify the following characteristics required of the selected transmission interception means 121: the ability to process data being transmitted by http protocol, the ability to determine the source from which the data was intercepted, e.g., the ability to determine the IP address of the site or its domain name, the ability to determine for whom the intercepted data is intended, e.g., to determine the name or path to the Google Chrome browser establishing the link to the amazon.com site, the ability to be installed in the system, e.g., the ability to modify the nonpublic fields of the class android.net.wifi.WifiConfiguration, and so on.

In another example, when a browser connects to a web site, the received data can be subdivided into html code, png images, and JavaScript scripts. Since the png images do not carry any malicious load, they can be written on a PC hard drive and executed, i.e. shown on the screen with any program capable of displaying images. The html code and JavaScript scripts are not granted any rights and are to be scanned upon interception. After the scanning they get the right to be written for subsequent use by the browser and, if the security settings are sufficiently weak, the right to be executed. The scanning or analysis of the html code and JavaScript scripts includes checking for maliciousness. If any components or elements are determined to be malicious, for example a JavaScript file, their security rights are reduces: for example, everything is forbidden for malicious code and execution is forbidden for spam. Therefore, the original security level for various types of data transmitted over a network is used, and further, after the received data are analyzed their security level can be revised and increased or reduced.

In another aspect, an example selection rules 111 may specify that the speed of operation (e.g., CPU utilization) of the selected transmission interception means 121 must be above a certain threshold. For example, on a weak PC, mobile device or highly specialized device, even if a highly functional transmission intersection means is available, it cannot be selected because the user device will not be able to support its functionality. Another example selection rule 111 may specify that the use of available resources does not exceed a specified threshold. For example, if the resources are limited on the user device, some transmission interception means 121 may not work properly or not work at all, and checking device resource utilization before selection of the transmission interception means 121 may prevent uncontrolled operation of the means 121. Another example selection rule 111 may require the selected transmission interception means 121 to have certain functions for obtaining certain data from the client or server for subsequent transfer of that data to other applications on the user device. Yet another example selection rule 111 may specify that selected transmission interception means 121 has access to certain devices or applications on the user device.

After the data analysis module 110 determines the characteristics of the transmission interception means 121, they are forwarded to the selection module 120.

The selection module 120, based on the characteristics of available interception means 121 received from the analysis means 110, selects from the available interception means 121 the one that matches the parameters of the network transmission and user device as well as the required security level. For example, for a site to browser connection, a proxy server is most appropriate (in terms of operating speed, requested resources, control capability, security provided for the data being transmitted in the network, and other criteria). After the interception means 121 has been selected, its identifier is sent to the installation module 130.

In an example aspect, the main task of the selection mode 120 is to use the obtained analysis results (the connection type, the type of data transmitted over a network, operating system resources, capability of user PC to execute a variety of tasks, and availability of rights necessary for these tasks) to determine which interception means 121 to use for optimal performance under the operation system. The optimality is evaluated under desirable criteria, for example: minimizing memory usage; increased speed of PC operation; increased security of the user PC and of the data transmitted at the selected level settings (such as prevention of damage, loss, or theft of data stored on the user PC or transmitted over a network); etc. When a specific security level is required, the interception means must fit certain requirements regarding where and how to store data transmitted over a network, how these data are processed and modified, etc. For example, when confidential data are transmitted from a site for authentication, the interception means 121 may work only within random access memory without caching data onto the hard drive.

Among the parameters relevant for selecting a firewall is its high processing speed and modest requirements to operating system resources. However, a firewall has limited capabilities and is useful typically for granting or denying access to network resources such as sites or network services. If only such capabilities are required, a firewall may be selected for use.

A proxy server is software implementing a network service allowing client computers to send indirect queries to other network services. Compared with a firewall, it requires more operating system resources and is slower. However, it has a wider range of capabilities. Besides blocking network connections, a proxy server can intercept, process, and modify data transmitted over a network. Installation of a proxy server on an operating system may require certain access rights (usually the administrator's rights). If such rights are not available, a proxy server cannot be used.

A VPN client is an application using technologies for establishing one or several network connections (a logical network) on top of another network. Such approach to data interception has broad capabilities (which may be even excessive), but often requires great amount of operating system resources (such as the memory size) and is generally slower. However, this is a very flexible approach, and it can be used when security policies do not permit using a proxy server.

The installation means 130 performs the installation of the selected interception means 121 in the operating system 101 on the user's smartphone. For example, for the installation of a proxy server, the corresponding changes will be entered in the nonpublic fields of the class android.net.wifi.WifiConfiguration. As a result, data (in the form of html code) being transmitted from the amazon.com site to the Google Chrome browser on the user's smart phone will be intercepted by the proxy server installed on the user's smartphone, where it will be processed (for example, a check will be made for malicious code and for conformity of the indicated site and the actually existing amazon.com site) and, depending on the results of the processing, will be further transmitted to the browser. If the selected network transmission interception means 121 has already been installed in the system, a fine tuning therefore can be performed, e.g., antivirus updates may be installed, administrator and user access setting changed, etc.

Figure 2:
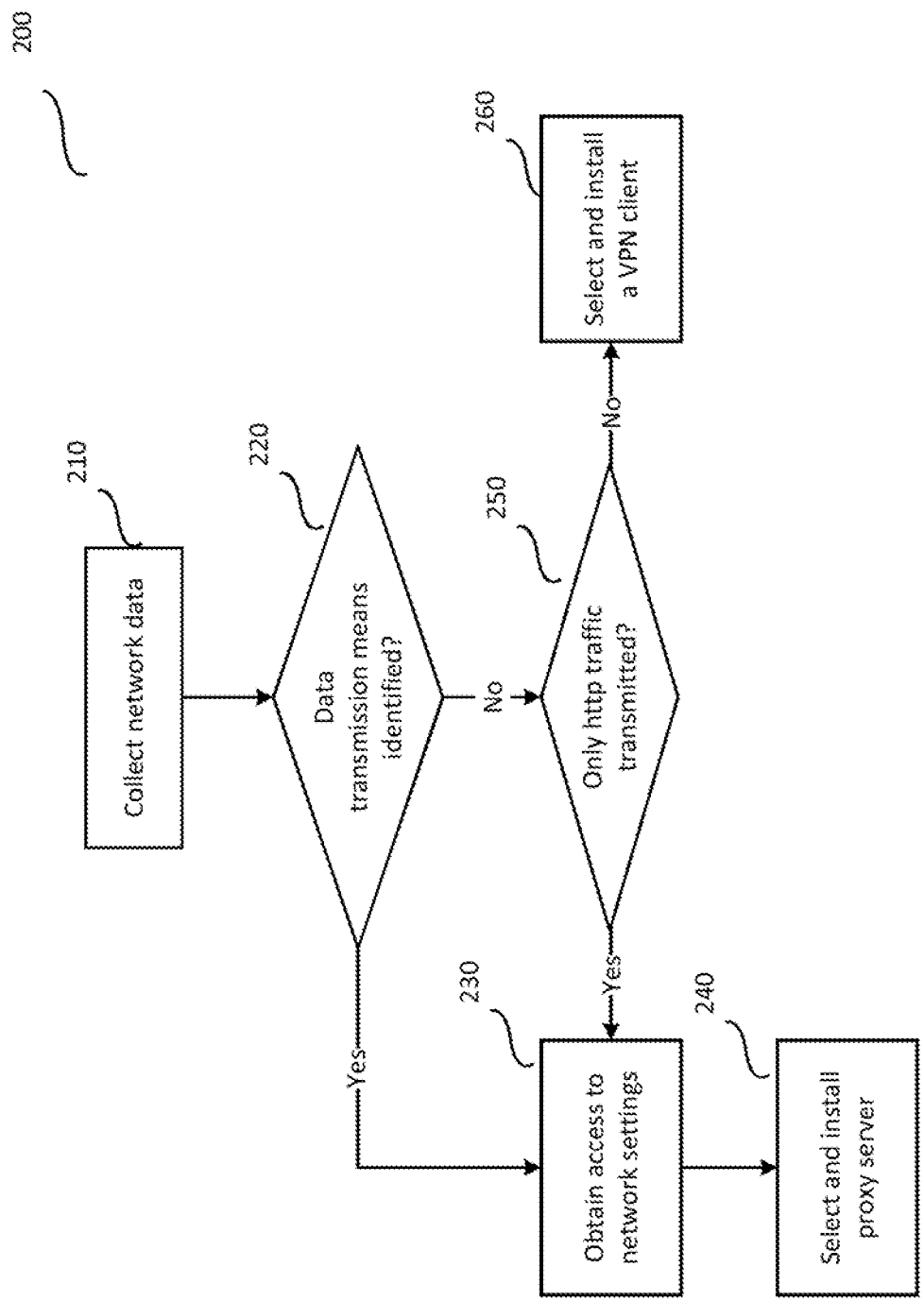
FIG. 2 illustrates a flow diagram of an example method for selecting means for intercepting network data transmissions according to one aspect of the invention.

FIG. 2 illustrates a flow diagram of an example method for selecting means for intercepting data transmitted on a network according to one aspect of the invention. Generally, the method 200 includes the following steps: at step 210, data collection module 105 collects network data including various parameters of data transmission means (i.e., a source of data transmission in the network). At step 220, analysis module 110 attempts to identify data transmission means for various transmissions on the network. If the data transmissions means have been identified for a particular transmission, then at step 230, the analysis module 110 obtains access to the network settings of the operating system of the user device for the purpose of modifying them for installation of the network transmission interception means 121. Then, at step 240, the selection module 120 selects a proxy server as a network transmission interception means 121, and installation module 130 installs the selected proxy server on the user device. The proxy server may be selected in this situation for the following reasons: A firewall does not have sufficient capabilities for this task because, while it can detect and block a network connection, it cannot intercept and process the data, a proxy server or a VPN server is required for this. A VPN client would use too many computer resources (in particular because of its broad capabilities). Therefore, a proxy server is an optimal choice in this situation.

However, if at step 220, the analysis module 110 cannot identify data transmission means, then at step 250, the analysis module 110 determines what type of traffic is transmitted on the network. If only HTTP traffic is transmitted, then at step 260, selection module 120 selects a VPN client as a network transmission interception means, and the installation module 130 installs the selected VPN client on the user device. The VPN client may be selected in this situation for the following reasons: A firewall does not have sufficient capabilities for this task because, while it can detect and block a network connection, it cannot intercept and process the data, a proxy server or a VPN server is required for this. To process http data transmitted over a network, when a proxy server cannot be installed for this purpose, a VPN client should be preferably used because it has sufficient capabilities for this task.

If, however, at step 250, it is determined that not only HTTP traffic is transmitted on the network, then at step 230, the analysis module 110 obtains access to the network settings of the operating system of the user device for the purpose of modifying them for installation of the network transmission interception means 121. Then, at step 240, the selection module 120 selects a proxy server as a network transmission interception means 121, and installation module 130 installs the selected proxy server on the user device. The proxy server may be selected in this situation for the following reasons: A firewall does not have sufficient capabilities for this task because, while it can detect and block a network connection, it cannot intercept and process the data, a proxy server or a VPN server is required for this. A proxy server can process http traffic and communications with sites, and also detects the origin of the http connection. A proxy server is thus particularly suitable for this task of working with http traffic. Using other methods in this case would waste operating system resources.

The following example illustrates the above-described method for selecting means of intercepting network transmission: There are two network transmission interception means 121 available to a user device—a proxy server and a VPN client. The user device establishes a connection between its Google Chrome browser and amazon.com website. It is necessary to determine which of the two available network transmission interception means 121 needs to be installed on the user device to provide maximum security for the data being transmitted through the network. From the parameters obtained by the data collection module 105, analysis module 110 determines if the name or IP address of the website with which the connection was established is known. If it is known, selection module 120 selects a proxy server as the network transmission interception means 121 for the use device. The installation module 130 obtains access to the nonpublic fields of the class android.net.wifi.WifiConfiguration in the OS of the user device and modifies them, thereby installing the proxy server. However, if the name or IP address of the website with which the connection was established are unknown, a determination is made as to whether http traffic is received from the website. If so (as for the site to browser connection), the proxy server is selected as the data intercepting means 121 and it is installed on the user device. Otherwise, the VPN client is selected and installed on the user device. Thus, for example, the proxy server will be selected for a website to browser connection, which provides simple installation, flexible setup and minimal demands on the resources of the operating system (since only the necessary functionality is used for working with the http protocol).

Figure 3:
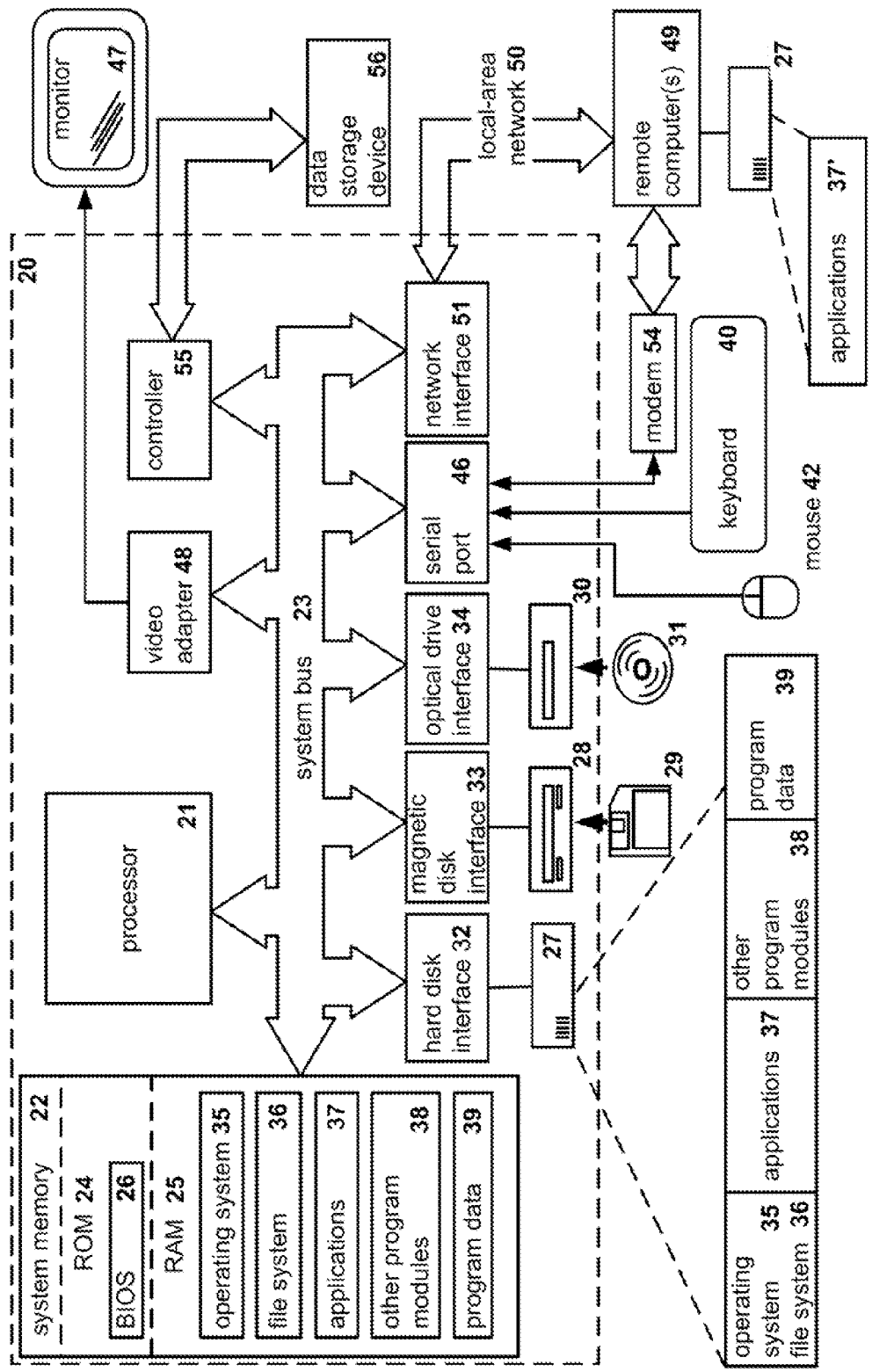
FIG. 3 shows a block diagram an example general-purpose computer system that may be used to implement systems and methods for selecting means for intercepting network data transmissions according to one aspect of the invention.

FIG. 3 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for selecting a means for intercepting network transmissions, the method comprising:
    determining, by a hardware processor, one or more parameters of a network transmission and one or more parameters of a user device that receives the network transmission;
    determining characteristics of a plurality of network transmission intercepting means that provide different levels of security to intercepted network transmissions based on the determined transmission parameters and user device parameters;
    selecting out of the plurality of network transmission interception means one means whose characteristics match the parameters of the network transmission, parameters of the user device, and a required security level for the network transmission; and
    installing on the user device the selected network transmission interception means that provide the required security level for the network transmission received by the user device;
    wherein the network transmission interception means comprises a firewall, a proxy server, or a virtual private network (VPN) client.

2. The method of claim 1, wherein the one or more parameters of the network transmission include:
    a type of data transmission network;
    a type of transmitted data; and
    a type of data transmission protocol.

3. The method of claim 1, wherein the one or more parameters of the user device include:
    one or more parameters of an operating system of the user device; and
    a name of a software application to which a data transmission is directed.

4. The method of claim 3, wherein the one or more parameters of the operating system include:
    access rights to resources of the operating system; and
    a presence of resources of the operating system on the user device.

5. The method of claim 3, wherein the characteristics of the network transmission interception means include:
    an ability to process certain types of data;
    an ability to identify data transmission means;
    an ability to identify data reception means; and
    an ability to work with various resources of the operating system.

6. The method of claim 1, wherein the required security level indicates at least one of: how the intercepted data are manipulated and under what conditions said manipulations are permitted.

7. A system for selecting a means for intercepting network transmissions, the system comprising:
    a data collection module configured to determine one or more parameters of a network transmission and one or more parameters of a user device that receives the network transmission;
    a data analysis module, comprising at least one hardware processor, configured to determine characteristics of a plurality of network transmission intercepting means that provide different levels of security to intercepted network transmissions based on the determined transmission parameters and user device parameters;
    a selection module configured to select out of the plurality of network transmission interception means one means whose characteristics match the parameters of the network transmission, parameters of the user device, and a required security level for the network transmission; and an installation module configured to install on the user device the selected network transmission interception means that provide the required security level for the network transmission received by the user device;

wherein the network transmission interception means comprises a firewall, a proxy server, or a virtual private network (VPN) client.

8. The system of claim 7, wherein the one or more parameters of the network transmission include:
- a type of data transmission network;
- a type of transmitted data; and
- a type of data transmission protocol.

9. The system of claim 7, wherein the one or more parameters of the user device include:
- one or more parameters of an operating system of the user device; and
- a name of a software application to which a data transmission is directed.

10. The system of claim 9, wherein the one or more parameters of the operating system include:
- access rights to resources of the operating system; and
- a presence of resources of the operating system on the user device.

11. The system of claim 9, wherein the characteristics of the network transmission interception means include:
- an ability to process certain types of data;
- an ability to identify data transmission means;
- an ability to identify data reception means; and
- an ability to work with various resources of the operating system.

12. The system of claim 7, wherein the required security level indicates at least one of: how the intercepted data are manipulated and under what conditions said manipulations are permitted.

13. A non-transitory computer readable medium storing computer executable instructions for selecting a means for intercepting network transmissions, including instructions for:
- determining one or more parameters of a network transmission and one or more parameters of a user device that receives the network transmission;
- determining characteristics of a plurality of network transmission intercepting means that provide different levels of security to intercepted network transmissions based on the determined transmission parameters and user device parameters;
- selecting out of the plurality of network transmission interception means one means whose characteristics match the parameters of the network transmission, parameters of the user device, and a required security level for the network transmission; and
- installing on the user device the selected network transmission interception means that provide the required security level for the network transmission received by the user device;
- wherein the network transmission interception means comprises a firewall, a proxy server, or a virtual private network (VPN) client.

14. The medium of claim 13, wherein the one or more parameters of the network transmission include:
- a type of data transmission network;
- a type of transmitted data; and
- a type of data transmission protocol.

15. The medium of claim 13, wherein the one or more parameters of the user device include:
- one or more parameters of an operating system of the user device; and
- a name of a software application to which a data transmission is directed.

16. The medium of claim 15, wherein the one or more parameters of the operating system include:
- access rights to resources of the operating system; and
- a presence of resources of the operating system on the user device.

17. The medium of claim 15, wherein the characteristics of the network transmission interception means include:
- an ability to process certain types of data;
- an ability to identify data transmission means;
- an ability to identify data reception means; and
- an ability to work with various resources of the operating system.

18. The medium of claim 13, wherein the required security level indicates at least one of: how the intercepted data are manipulated and under what conditions said manipulations are permitted.

* * * * *